Feb. 6, 1962     F. R. DICKEY, JR     3,020,541

ELECTRICAL SIGNAL INDICATOR

Filed Oct. 27, 1953

FROM VIDEO AMP.

Inventor:
Frank R. Dickey Jr.
by Charles M. Hutchins
His Attorney.

United States Patent Office 3,020,541
Patented Feb. 6, 1962

3,020,541
ELECTRICAL SIGNAL INDICATOR
Frank R. Dickey, Jr., Alexandria, Va., assignor to General Electric Company, a corporation of New York
Filed Oct. 27, 1953, Ser. No. 388,528
13 Claims. (Cl. 343—11)

This invention relates to electrical signal indicating systems and particularly to the type employing a cathode ray tube.

In systems involving the flow, storage or display of electrical signal information, the need often arises for increasing the information handling capacity of the system. This need is generally associated with the requirement that the further information be accommodated, or that the existing information be enhanced in a simple and efficient manner. For example in an object detection apparatus of the radar type, the location of the detected object is often-times displayed on the screen of the cathode ray tube indicator in terms of a maximum of two or three positional coordinates. In the past, any additional, related information generally has been accommodated by resort to relatively complicated and expensive circuitry associated with the indicator.

It is therefore an object of my invention to increase, in an improved manner, the amount of information that may be accommodated by a cathode ray tube indicating system.

Another object of my invention is to extend the usefulness of a cathode ray tube indicator by the use of auxiliary cathode ray deflection elements.

Another object of my invention is to improve the quality of angular information displayed on a cathode ray tube indicator associated with a radar object detection system.

Another object of my invention is to provide an improved arrangement for displaying information on the screen of a cathode ray tube.

Another object of my invention is to provide an improved arrangement for indicating position information of radar detected objects.

A still further object of my invention is to enhance the display of angular information available from a monopulse radar object detection system, on the screen of a cathode ray tube indicator.

In accordance with one embodiment of my invention, applicable to radar object detection systems of say the monopulse, or multi-beam type, the echoes received from a detected object are first processed in the radar receiver, and then applied to a cathode ray tube indicator in a manner to provide enhanced angular information of the detected object location. Briefly the invention involves processing the phase or amplitude modulation appearing in the received echoes, which contain the angular information associated with the detected objects location, into a suitable amplitude modulated signal. The resultant amplitude modulated signal is applied to an auxiliary, magnetic electron beam deflection element associated with a cathode ray tube indicator in a manner to permit additional or enhanced control of the sweeping of a cathode ray trace on the screen of the indicator.

The features of the present invention which are believed to be novel are set forth with particularity in the appended claims. The present invention itself both as to its organization and manner of operation together with further objects and advantages thereof may best be understood by reference to the following description taken in connection with the accompanying drawings in which:

In the following description of a radar position indicating system embodying the invention, certain wave forms, or sweep configurations are assigned at various portions of the system in order to facilitate an understanding of its operation. It is to be understood, however, that such assignments are employed purely by way of example and are not to be construed in any way as limiting the scope of the invention.

Figure 1:
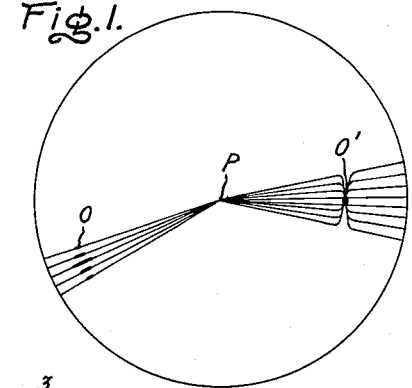
FIG. 1 is a schematic representation of the improvement in angular resolution obtainable by use of the invention.

Referring to FIG. 1, there is shown a plan position indication type of display, commonly employed in radar object detection systems, symbolizing the transmission of pulse of electromagnetic waves from the radar station P in a narrow beam which is rotated about P to irradiate remote objects. This display indicates that an object O has been detected at a range from the radar station P corresponding to the radial distance OP, and that the object has a bearing with respect to the station P corresponding to the direction of a radial line drawn from P to O. Since a radar beam projected from P to O has a finite width, echoes would be received from O for a plurality of successive pulse transmissions as has been represented by the plurality of radial lines passing through O. It should be noted that the directional features of the radar beam results in an amplitude modulation of the received echoes which account for the elongated, or arc shape of the composite echo returns O. It can be seen that this elongation of the composite echoes is undesirable from the standpoint of resolving the exact angular position of the detected object.

To improve the angular display of detected objects on the screen of the cathode ray tube, the plurality of echoes received in the same beam width are processed and applied to the cathode ray tube indicator in a manner to cause each successive echo from a detected object to be displaced towards a single spot position O' in accordance with the instantaenous angular displacement of the object position from the center of the radar beam. This displacement has been illustrated in an exaggerated manner in FIG. 1 by showing the successive radial sweeps corresponding to successive echo returns, being deflected in towards the exact object position O'. The result is a much improved angular position indication of the detected object.

Figure 2:
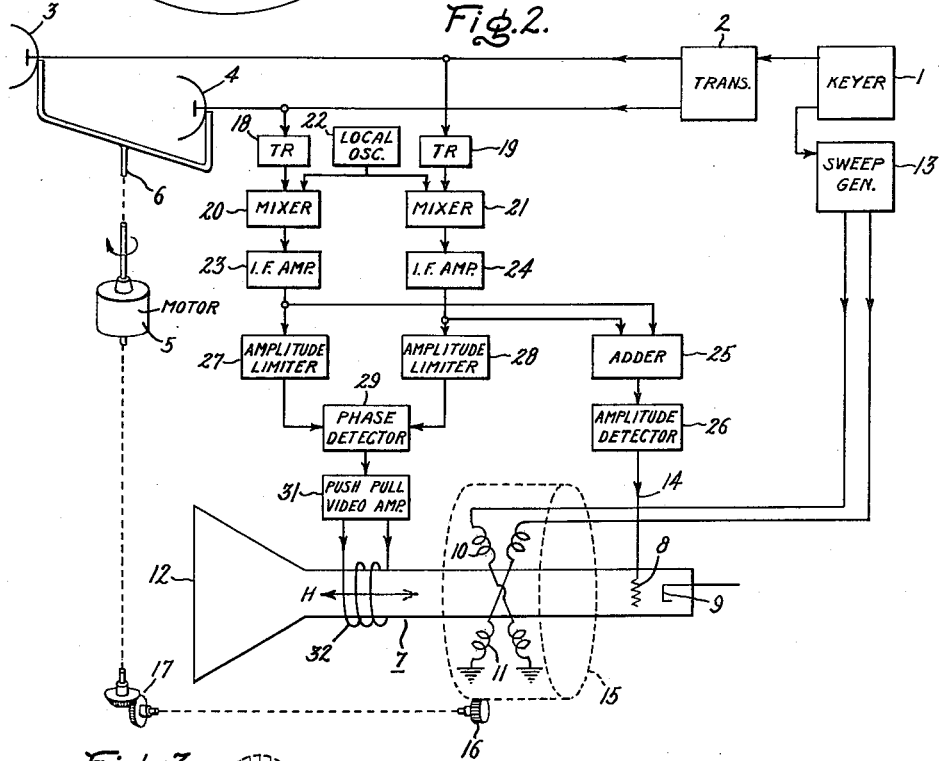
FIG. 2 is a block diagram of a radar object detection and position indication system involving the invention.

The manner in which the improvement in angular indication is obtained is illustrated in the embodiment of FIG. 2 relating to a monopulse radar object detection and location arrangement. Briefly a monopulse radar system employs a plurality of different antenna reception patterns of the phase or amplitude comparison type, which yield echo signals that vary in accordance with a departure of the center of the reception pattern from the "on target" angular position. In FIG. 2, there is shown a source 1 of keying pulses of predetermined rate. These pulses are applied to the transmitter 2 and cause it to supply high-powered pulses of radio frequency waves at said rate to the spaced apart antennas 3 and 4 for irradiating remote objects in space. Echoes corresponding to the transmitted pulses reflected from these remote objects are received by antennas 3 and 4 and processed in a manner to be disclosed shortly, to yield range and angular information of the objects' location. Antennas 3 and 4 have spaced apart directivity patterns adapted to permit angular detection of remote objects, irradiated by the transmitted radar pulse, by means of phase comparison of the echoes received from the objects. The narrow radar beams defined by antennas 3 and 4 simultaneously are caused to angularly scan a 360° or any predetermined arc by means of motor 5 which drives the antennas about the vertical axis 6. Thus the radar system is able to irradiate and thereby detect objects located about it.

In order to display the detected objects, a cathode ray tube indicator 7 is provided. Indicator 7 comprises a cathode 9, constituting a source of an electron beam, and a control electrode 8 for intensity modulating the electron beam. A pair of magnetic deflection elements 10 and 11 are provided for deflecting or sweeping the electron beams in a desired manner across the screen 12, and thereby cause a visible trace, similar to that shown in FIG. 1, to be produced thereon. The details of the phosphorescent screen, the forming and focusing of the electron beam, etc. are well known in the art and consequently are omitted.

To obtain the plan position type of indication, previously described in connection with FIG. 1, a sweep generator 13 is employed to generate recurrent electron beam deflection signals of the push-pull type in response to each keying pulse delivered by keyer 1. These deflection signals, upon application to the deflection elements 10 and 11 cause the electron beam to sweep radially outward from a central point on the screen of the cathode ray tube indicator 12 in synchronism with each pulse transmission by antennas 3 and 4. Upon the subsequent reception at antennas 3 and 4 of an echo signal, corresponding to a reflection of the high powered transmitted pulse from a detected object.

A signal is generated and applied over lead 14 to electrode 8 in a manner to be described shortly. This signal causes the radial trace to be intensified at a point distant from its central point, corresponding to the range of the detected object. In order to indicate the angular position of the detected object, the deflection elements are caused to be physically rotated in the housing 15 about the neck of the cathode ray tube indicator 7 in synchronism with the antenna position by means of the mechanical driving connections 16 and 17 to motor 5. This rotation causes the angular position of the radial trace to follow the direction in which the antennas 3 and 4 are pointing and therefore to indicate the angular direction of any object from which echoes are being received.

Figure 3:
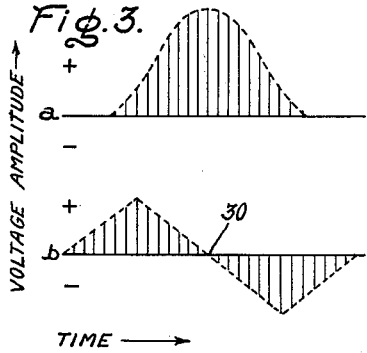
FIG. 3 is a group of wave forms useful in explaining the operation of the arrangement of FIG. 2.

The plan position type of indication described so far in connection with FIG. 1, because of the finite widths of the reception patterns of antennas 3 and 4 would normally cause an elongated or arc type of echo indication O, FIG. 1 to be obtained. In order to derive the more desirable spot type of indication O', the following arrangement is employed. Returning to FIG. 2, the echo signals received by antennas 3 and 4 are applied through separate TR boxes 18 and 19 and to respective mixer circuits 20 and 21. The TR boxes operate in well known manner to block the application of the high powered radar pulses from transmitter 2 to the mixer circuits 20 and 21 during the transmitting periods, while permitting the much weaker echo signals to be passed with high efficiency. The separate echo signals passed by the TR boxes are converted to an intermediate frequency by mixing with local oscillations available from oscillator 22 in the respective circuits 20 and 21. After amplification to a suitable level in respective amplifiers 23 and 24, the echo signals are added together in circuit 25, amplitude detected by circuit 26 and applied over lead 14 to electrode 8 for intensity modulating the radial cathode ray trace previously described at the proper range of the detected object. The shape of the echo signal available at electrode 8 is similar to that shown in FIG. 3a.

The amplified echo signals from 23 and 24 are also applied through respective circuits 27 and 28, where their amplitudes are first limited to a predetermined level, to the phase detector 29. Phase detector 29 delivers an output signal having an amplitude proportional to the phase difference of the related echoes received at antennas 3 and 4 and available from limiters 27 and 28. For further details of the detector operation, reference may be made to the Radiation Laboratory Series, vol. #1, Radar System Engineering, page 667, Louis N. Ridenour, 1947, McGraw-Hill Book Company, Inc. New York, N.Y. The output signal available from detector 29 is of the form shown in FIG. 3b. It should be noted that the detected object's angular position is defined by the point where the amplitude of signal shown in FIG. 3b passes through zero at 30, and that the amplitude varies linearly in the positive-going and negative-going directions from this point. The reverse slopes at either end of this characteristic may be disregarded. Use is made of the desirable linear characteristic passing through 30 by applying the phase detector output through a push-pull video amplifier stage 31 to the auxiliary magnetic deflection element 32. In a particular embodiment of the invention, the element 32 comprised several turns of wire wrapped around the neck of the cathode ray tube in a manner to provide a magnetic field within the cathode ray tube which is axially directed to the central point (corresponding to point P of FIG. 1) of the radial traces produced on the screen 12. The effect of applying the positive-going and negative-going amplitude signals to the element 32 is to cause the amplitude of the magnetic field vector H, describing the magnetic field, to vary correspondingly and to change sign as indicated by the solid and dotted arrow head. The amplitude modulation of the magnetic field vector H along the axial direction of the cathode ray tube indicator 7 causes the electron beam, which emanates from the cathode 8 and which is deflected radially from the central point on the screen 12 in accordance with the sweep signals applied to deflection elements 10 and 11, to be further deflected at an angle to the radial deflection as shown at O' in FIG. 1. As the radial traces of FIG. 1 approach the on target position O', the large positive-going signals diminish, and when the radial traces start leaving the on target position O' the negative-going signals increase in amplitude in a manner to cause successive echoes received during the same beam width to be piled upon one another at the point O'. Thus instead of obtaining an elongated or arc type of indication representing the angular position of the detected objects location, a sharply defined spot is obtained coinciding substantially with the true, sharply defined angular location.

Figure 4:
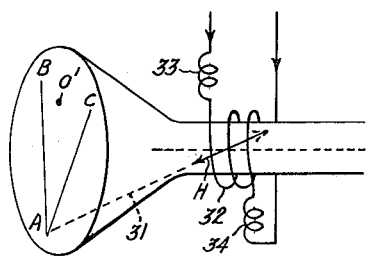
FIG. 4 is a schematic representation of a further embodiment of the invention.

While the invention has been described in terms of a centered plan position type of indication, it is obvious that the invention can be readily adapted for other types of displays. For example in FIG. 4 the invention is applied to an off-center type of plan position indication associated with sector scan antenna operation. In this arrangement the normal deflection elements, corresponding to 10 and 11 of FIG. 2, cause the radial sweep AB, emanating from the point A, to take up successive angular positions in the pie-section outlined by BAC. This type of off-center display is popular where it is desired to magnify a given sector of scan by making use of the entire face of a cathode ray tube screen. Since the radial sweeps in this arrangement are caused to emanate from an off set point A, rather than from the center of the screen of the cathode ray tube, it is necessary that the magnetic field, defined by the auxiliary deflection element, be oriented in the direction of the off-center point A as indicated by the dotted line extension 31. This can be readily accomplished in one way by physically orienting the loops comprising the auxiliary deflection element so that the desired magnetic field directivity is obtained. In the arrangement of FIG. 4, however, the auxiliary winding portion 32, which would normally provide a magnetic field along the axis of the cathode ray tube, is augmented by introducing a magnetic field at right angles to this axial direction by use of compensating windings 33 and 34. This arrangement is so dimensioned electrically that the axial field and the orthogonal field combine to produce the desired directivity of the magnetic field indicated by the orientation of the magnetic field vector H. In other respects the arrangement of FIG. 4 is similar to that described in connection with FIG. 2. The resultant magnetic field produced by the auxiliary winding 32 and the compensating windings 33 and 34, causes the successive echo indications produced on the screen of the cathode ray tubes to be deflected towards the exact detected object location point O' as shown in FIG. 1.

While the invention has been described with respect to a particular type of display, it is obvious that other displays may be accommodated. For example, the system is generally applicable to any radial type of sweep in which a further deflection at an angle to this normal sweep is to be provided in accordance with available signals. Furthermore the invention is applicable to other forms of radar object detection systems, such as the amplitude comparison, or combined amplitude and phase comparison monopulse type. It merely being necessary to derive the desired, enchanced object location information from the modulation components contained in the received echoes and to modify the normal radial sweep descriptive of the object's location accordingly.

While specific embodiments have been shown and described it will, of course, be understood that various modifications may be made without departing from the principles of the invention. The appended claims are therefore intended to cover any such modifications within the true spirit and scope of the invention.

What I claim as new and desire to secure by Letters Patent of the United States is:

1. A radar object location system comprising means for transmitting pulses of radio frequency waves toward objects in space, antenna means comprising a plurality of directive reception patterns for separately receiving echoes returned from objects irradiated by said transmitted pulses, a cathode ray tube indicator, means for producing a polar sweep on the screen of said cathode ray tube indicator timed with said pulse transmissions, means responsive to said received echoes for intensifying said sweep, means for deriving a signal from said separately received echoes having an amplitude indicative of the angular position of the located object relative to the directivity of said antenna reception patterns, and means independent of said sweep producing means for directing said polar sweep to an angle different from its radial direction in accordance with said derived signal.

2. A monopulse radar object location system comprising means for transmitting pulses of radio frequency waves toward an object in space and for receiving a plurality of corresponding echoes returned from said object wherein said echoes contain modulation components indicative of the objects angular location, a cathode ray tube indicator comprising a screen, means for producing a sweep in a given direction on the screen of said cathode ray tube timed with said pulse transmissions, means for deriving a signal from said received echoes indicative of said angular location of said object, and means independent of said sweep producing means for modifying the radial direction of said sweep in accordance with said derived signal.

3. A radar object location system comprising means for transmitting pulses of radio frequency waves toward objects in space, means for receiving echoes returned from objects irradiated by said transmitted pulses, a cathode ray tube indicator comprising a screen, means for producing a radial sweep on the screen of said cathode ray tube timed with said pulse transmissions, means for deriving a signal from said received echoes corresponding to the angular position of the object, a magnetic deflection element associated with said cathode ray tube indicator for directing said radial sweep at an angle to its radial direction, and means for applying said derived signal to said magnetic deflection element.

4. A radar object location system comprising means for transmitting pulses of radio frequency waves toward an object in space, antenna means comprising two spaced apart directive reception patterns for separately receiving echoes returned from said object irradiated by said transmitted pulses, a cathode ray tube indicator, means for producing a radial sweep on the screen of said cathode ray tube indicator timed with each pulse transmission, means responsive to said received echoes for intensifying said sweep, means responsive to the relative phase of said received echoes for deriving a signal having an amplitude corresponding to the angular position of said object relative to the directive centers of said antenna reception patterns, means for producing a magnetic field having an intensity corresponding to the amplitude of said signal, and means for directing said sweep at an angle to its radial direction in accordance with said field.

5. A radar object location system comprising means for transmitting pulses of radio frequency waves toward objects in space, antenna means comprising a plurality of directive reception patterns for separately receiving echoes returned from objects irradiated by said transmitted pulses, a cathode ray tube indicator comprising a screen, means for producing a polar sweep on the screen of said cathode ray tube timed with each pulse transmission, means for combining said separately received echoes, means for intensifying said sweep in accordance with said combined echoes, means for deriving a signal from said separately received echoes having an amplitude corresponding to the angular position of the object relative to the antenna directivity patterns, a magnetic deflection element associated with said cathode ray tube indicator for modifying said polar sweep at right angles to its sweep direction, and means for applying said derived signal to said magnetic deflection element.

6. A radar object location system comprising means for transmitting pulses of radio frequency waves in a narrow beam toward objects in space, antenna means comprising a plurality of spaced apart reception patterns for separately receiving echoes returned from obejcts irradiated by said transmitted pulses, means for angularly rotating the directivity of said patterns, a cathode ray tube indicator comprising a screen, means for producing a polar sweep on the screen of said cathode ray tube timed with each pulse transmission, means for angularly rotating said sweep in synchronism with the rotation of said reception patterns, means for combining said separately received echoes, means for intensifying said sweep in accordance with said combined echoes, means for deriving a signal from said separately received echoes having an amplitude corresponding to the angular position of the object relative to said antenna reception patterns, a magnetic deflection element associated with said cathode ray tube indicator for modifying said polar sweep at an angle to its sweep direction, and means for applying said derived signal to said magnetic deflection element.

7. Indicating apparatus for signal display comprising a cathode ray tube indicator, said indicator comprising a screen and means for producing and projecting an electron beam toward said screen, a first beam deflecion element for sweeping said beam across said screen to produce a polar trace centered about a given point, means for deflecting said swept beam at an angle to its polar sweep said element comprising a separate beam deflection element, comprising a coil associated with said indicator for producing a magnetic field in the path of said swept beam which is aligned with said point, signal responsive means for modifying the brightness of said sweep in accordance with an applied signal and signal responsive means for varying the intensity of said field in accordance with an applied signal.

8. Indicating apparatus comprising a cathode ray tube, said tube comprising a screen and means for producing and projecting an electron beam toward said screen, means for simultaneously progressively translating said beam over said screen to produce a normal trace and means for positionally modifying the rate of progression of said trace in accordance with an applied signal, said last named means comprising means separate from said translating means for producing a magnetic field in the path of said swept beam.

9. Indicating apparatus comprising a cathode ray tube indicator, said indicator comprising a screen, means for producing and projecting an electron beam towards said screen, means for recurrently sweeping said beam over an area of said screen to produce polar trace thereon centered about a given point, means for modifying said trace by deflecting said swept beam a right angles to its polar sweep comprising means for producing a magnetic field in the path of said swept beam which is aligned with said point and means for varying the amplitude of said field in accordance with an applied signal.

10. Indicating apparatus for signal display comprising a cathode ray tube indicator, said indicator comprising a screen, means for producinbg and projecting an electron beam towards said screen, means for sweeping said beam across said screen to produce a polar trace over an area thereon centered about a given point and signal responsive means for modifying said trace by deflecting said swept beam at an angle to its polar sweep comprising means for producing a magnetic field in the path of said swept beam which is oriented with respect to said point.

11. Indicating apparatus for signal display comprising a cathode ray tube indicator, said indicator comprising a screen and means for producing and projecting an electron beam towards said screen, means for sweeping said beam across said screen to produce a two coordinate trace thereon centered on a given point, and means for modifying said trace by deflecting said swept beam at an angle to the direction of said trace comprising means for producing two orthogonally-oriented magnetic fields in the path of said swept beam, fields being dimensioned to produce a resultant magnetic field aligned with said given point, and signal responsive means for varying the intensity of said fields to control the degree of modification of said trace.

12. Indicating apparatus for signal display comprising a cathode ray tube indicator, said indicator comprising a screen and means for producing and projecting an electron beam towards said screen, means for sweeping said beam across said screen o produce a trace thereon, and signal responsive means for modifying said trace comprising means for producing a first magnetic field in the path of said swept beam which is aligned in a given direction and signal responsive means for producing a second magnetic field in the path of said swept beam which is at an angle to said given direction.

13. Indicating apparatus for signal display comprising a cathode ray tube indicator, said indicator comprising a screen, means for producing and projecting an electron beam towards said screen, means for recurrently sweeping said beam across said screen to produce polar traces thereon centered about a given point, means for angularly displacing said traces about said point, means for producing a magnetic field in the path of said swept beam which is aligned with said point, and means for modifying said traces comprising signal responsive means for altering the intensity of said field as said traces are angularly displaced.

References Cited in the file of this patent

UNITED STATES PATENTS

| | | |
|---|---|---|
| 2,456,666 | Agate et al. | Dec. 21, 1948 |
| 2,557,869 | Gloess | June 19, 1951 |
| 2,589,249 | Hardy | Mar. 18, 1952 |
| 2,608,683 | Blewett | Aug. 26, 1952 |
| 2,660,721 | Page | Nov. 24, 1953 |
| 2,745,097 | Bartelink | May 8, 1956 |
| 2,948,892 | White | Aug. 9, 1960 |